(12) United States Patent
Hombauer

(10) Patent No.: US 11,059,365 B2
(45) Date of Patent: Jul. 13, 2021

(54) DRIVE DEVICE FOR A HYBRID-DRIVEN MOTOR VEHICLE, AND MOTOR VEHICLE ASSOCIATED THEREWITH

(71) Applicant: Bayerische Motoren Werke Aktiengesellschaft, Munich (DE)

(72) Inventor: Michael Hombauer, Harthausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 742 days.

(21) Appl. No.: 15/896,310

(22) Filed: Feb. 14, 2018

(65) Prior Publication Data
US 2018/0170167 A1 Jun. 21, 2018

Related U.S. Application Data

(63) Continuation of application No. PCT/EP2016/069259, filed on Aug. 12, 2016.

(30) Foreign Application Priority Data

Sep. 10, 2015 (DE) ...................... 10 2015 217 286.4

(51) Int. Cl.
*B60K 6/547* (2007.10)
*B60K 6/40* (2007.10)
(Continued)

(52) U.S. Cl.
CPC ............ *B60K 6/40* (2013.01); *B60K 6/387* (2013.01); *B60K 6/48* (2013.01); *B60K 6/547* (2013.01);
(Continued)

(58) Field of Classification Search
CPC . B60K 6/36; B60K 6/387; B60K 6/40; B60K 6/48; B60K 6/547; F16H 3/087; F16H 3/089; F16H 3/093
(Continued)

(56) References Cited

U.S. PATENT DOCUMENTS 8,661,941 B2 * 3/2014 Hellenbroich .......... F16H 3/097 74/661
8,979,693 B2 * 3/2015 Hellenbroich .......... F16H 3/091 475/5

(Continued)

FOREIGN PATENT DOCUMENTS

CN 101516708 A 8/2009
CN 101535680 A 9/2009
(Continued)

OTHER PUBLICATIONS

International Search Report (PCT/ISA/210) issued in PCT Application No. PCT/EP2016/069259 dated Oct. 18, 2016 with English translation (five pages).

(Continued)

*Primary Examiner* — William C Joyce
(74) *Attorney, Agent, or Firm* — Crowell & Moring LLP

(57) ABSTRACT

A drive device for a hybrid-driven motor vehicle includes a primary drive, a secondary drive, and a variable speed gearbox. The primary and secondary drives are configured to drive the gearbox separately or jointly. The gearbox includes a first input shaft connectable to the primary drive, a second input shaft connectable to the secondary drive, an output shaft, and switching elements. In a first state of the gearbox, a rotational movement of a first fixed toothed wheel of a first intermediate shaft is synchronously coupled with a rotational movement of the output shaft by a first switching element. In a second state, a rotational movement of a first idler toothed wheel on the first input shaft is synchronously coupled with a rotational movement of a second idler toothed wheel on the first input shaft by a second switching element.

20 Claims, 3 Drawing Sheets

(51) Int. Cl.
  *B60K 6/387* (2007.10)
  *B60K 6/48* (2007.10)
  *F16H 3/089* (2006.01)
  *F16H 3/08* (2006.01)
  *B60K 6/36* (2007.10)

(52) U.S. Cl.
  CPC ............... *F16H 3/089* (2013.01); *B60K 6/36* (2013.01); *B60K 2006/4816* (2013.01); *B60K 2006/4841* (2013.01); *F16H 2003/0807* (2013.01); *F16H 2200/0052* (2013.01); *Y02T 10/62* (2013.01)

(58) Field of Classification Search
  USPC .......................................................... 74/661
  See application file for complete search history.

(56) References Cited

U.S. PATENT DOCUMENTS

| | | | |
|---|---|---|---|
| 10,315,659 B2* | 6/2019 | Jacoby | B60W 30/19 |
| 2009/0176617 A1 | 7/2009 | Dilzer | |
| 2011/0030488 A1 | 2/2011 | Gumpoltsberger et al. | |
| 2011/0263379 A1* | 10/2011 | Liang | B60W 20/30 |
| | | | 477/5 |
| 2015/0107408 A1 | 4/2015 | Kaltenbach et al. | |

FOREIGN PATENT DOCUMENTS

| | | |
|---|---|---|
| CN | 103161918 A | 6/2013 |
| DE | 1 898 289 U | 8/1964 |
| DE | 10 2006 054 281 A1 | 6/2008 |
| DE | 10 2009 023 499 * | 12/2010 |
| DE | 10 2011 002 472 A1 | 7/2012 |
| DE | 10 2012 217 021 A1 | 3/2014 |
| DE | 10 2013 221 461 A1 | 4/2015 |
| FR | 1 219 046 A | 5/1960 |

OTHER PUBLICATIONS

German-language Written Opinion (PCT/ISA/237) issued in PCT Application No. PCT/EP2016/069259 dated Oct. 18, 2016 (eight pages).

German-language Search Report issued in counterpart German Application No. 10 2015 217 286.4 dated May 13, 2016 with partial English translation (10 pages).

Chinese-language Office Action issued in counterpart Chinese Application No. 201680030878.7 dated Aug. 26, 2019 with English translation (15 pages).

* cited by examiner

|  | Shift element No. | | | | | | |
|---|---|---|---|---|---|---|---|
|  | 1 | 2 | 3 | 4 | 5 | 6 | 7 |
| 1st gear | X | X | (X) |  |  | (X) |  |
| 2nd gear | X |  | (X) | X |  | (X) |  |
| 3rd gear | X | X | (X) |  |  | (X) |  |
| 4th gear |  |  | (X) | X |  | (X) | X |
| 5th gear |  |  | (X) |  | X | (X) | X |
| 6th gear |  |  | (X) |  | X | (X) | X |

FIG. 3

|  | EM | | |
|---|---|---|---|
| ICE | 1 | 2 | 3 |
| 1 | X | X |  |
| 2 | X | X |  |
| 3 | X | X |  |
| 4 |  | X | X |
| 5 |  | X | X |
| 6 |  | X | X |

FIG. 2

DRIVE DEVICE FOR A HYBRID-DRIVEN MOTOR VEHICLE, AND MOTOR VEHICLE ASSOCIATED THEREWITH

CROSS REFERENCE TO RELATED APPLICATIONS

This application is a continuation of PCT International Application No. PCT/EP2016/069259, filed Aug. 12, 2016, which claims priority under 35 U.S.C. § 119 from German Patent Application No. 10 2015 217 286.4, filed Sep. 10, 2015, the entire disclosures of which are herein expressly incorporated by reference.

BACKGROUND AND SUMMARY OF THE INVENTION

The present invention relates to a drive device for a hybrid-driven motor vehicle.

In motor vehicles having a hybrid drive, drive devices are known in which an internal combustion engine as a primary drive and an electric motor as a secondary drive together output to an input shaft of a speed change gearbox. It is advantageous here that all gears of the gearbox can theoretically be used with the internal combustion engine and/or the electric motor.

In other known drive devices, the internal combustion engine acts on a first input shaft and the electric motor acts on a second input shaft of a common gearbox, which can be more advantageous in terms of the speed range of the drives and the transmission configuration of the gears. The gearboxes used according to the prior art can be planetary gears, gear trains or combinations thereof.

An object of the invention is to further improve the known drive device in terms of the required installation space, the efficiency of the gears and the functionality in the cooperation of the drives.

This and other objects are achieved by a drive device for a hybrid-driven motor vehicle in accordance with embodiments of the invention.

A drive device for a hybrid-driven motor vehicle includes a primary drive, a secondary drive and a gearbox. The primary drive and the secondary drive are designed to output to the gearbox separately or together. The gearbox has a first input shaft, which can be operatively connected to the primary drive, a second input shaft, which can be operatively connected to the secondary drive, an output shaft and shift elements. The gearbox has a first intermediate shaft on which a first fixed gearwheel is arranged and which can be operatively connected to the first input shaft and the second input shaft. In a first state of the gearbox, a rotational movement of the first fixed gearwheel of the first intermediate shaft is synchronously coupled to a rotational movement of the output shaft via a first shift element of the shift elements. In a second state of the gearbox, a rotational movement of a first idler gearwheel on the first input shaft is synchronously coupled to a rotational movement of a second idler gearwheel on the first input shaft via a second shift element of the shift elements. The first idler gearwheel on the first input shaft meshes with a fixed gearwheel of the output shaft and the second idler gearwheel on the first input shaft meshes with the first fixed gearwheel on the first intermediate shaft.

The term "fixed gearwheel" here means that the corresponding gearwheel is connected to the corresponding shaft in a rotationally-fixed manner. The term "idler gearwheel" means that the corresponding gearwheel is arranged on the corresponding shaft in such a way that it is freely rotatable relative to the shaft provided that the rotational movement of the gearwheel is not coupled to a rotational movement of the shaft by way of a corresponding shift element or a corresponding clutch or provided that the gearwheel is not connected to the shaft in a rotationally-fixed manner by way of the shift element or the clutch.

In a case in which both the idler gearwheels and the fixed gearwheels are formed as spur gears, the first input shaft, the second input shaft, the output shaft and the first intermediate shaft can be arranged in such a way that their axes of rotation are aligned parallel to one another, wherein the first intermediate shaft is preferably arranged coaxially to the output shaft. The axes of rotation of the first input shaft, the second input shaft and the output shaft here can form the corner points of a triangle in a cross-section which is perpendicular to the axes of rotation. It is thus possible to achieve an extremely compact construction of the drive device.

In another case, the idler gearwheels and/or the fixed gearwheels can be formed as bevel gears.

Owing to the arrangement of the first intermediate shaft and the first shift element and the second shift element, the rotational movement of the first intermediate shaft, which can be operatively connected to the first input shaft and the second input shaft and therefore to the primary drive and the secondary drive, can be transferred to the output shaft directly via the first shift element or indirectly via the second shift element.

The rotational movement of the first intermediate shaft can thus be transferred to the output shaft with the aid of different transmissions. Therefore, particularly favorable gear increments are possible with a high gear spread for a primary drive formed as an internal combustion engine and a very adequate gear spread for a secondary drive formed as an electric motor (e.g., greater than 5 and up to 11 for the primary drive) which, to the greatest extent possible, enables the driving experience of an exclusively electric car in the higher speed range as a result of the associated speed reduction of the primary drive.

In particular, according to one embodiment, a third idler gearwheel can be arranged on the first input shaft, which gearwheel meshes with a second fixed gearwheel of the first intermediate shaft or is in engagement therewith. In both the first state of the gearbox and the second state of the gearbox, either a rotational movement of the second idler gearwheel on the first input shaft can be coupled to the rotational movement of the first input shaft by a third shift element of the shift elements so that the second idler gearwheel on the first input shaft is connected to the first input shaft in a rotationally-fixed manner, or a rotational movement of a third idler gearwheel on the first input shaft can be coupled to the rotational movement of the first input shaft by a fourth shift element of the shift elements, so that the third idler gearwheel on the first input shaft is connected to the first input shaft in a rotationally-fixed manner.

In this embodiment, therefore, the rotational movement of the first input shaft can be advantageously transferred to the first intermediate shaft with the aid of different transmissions.

The first shift element and the second shift element are preferably each formed as a clutch acting with form fit. The first shift element and the second shift element can be actuated together by a single actuator to shift between the first state and the second state of the gearbox.

Therefore, in this embodiment, only one shift fork is required to shift between the first state and the second state of the gearbox.

The third shift element and the fourth shift element can furthermore be formed as a common synchronous dual clutch.

Therefore, in this embodiment, only one shift fork is required to connect either the second idler gearwheel of the first input shaft or the third idler gearwheel of the first input shaft to the first input shaft in a rotationally-fixed manner.

According to a further embodiment, the gearbox can have a second intermediate shaft on which a fixed gearwheel is arranged, which is operatively connected to a fixed gearwheel of the first input shaft. The rotational movement of the first intermediate shaft and a rotational movement of the second intermediate shaft can be coupled via a fifth shift element of the shift elements.

In this embodiment, the rotational movement of the first input shaft can be transferred to the first intermediate shaft with the aid of a further transmission. All in all, it is possible to shift or adjust in particular six gears for the primary drive with the aid of the drive device according to this embodiment of the invention.

The first intermediate shaft and the second intermediate shaft here are preferably arranged coaxially to the output shaft. The first intermediate shaft is formed as a hollow shaft. The second intermediate shaft extends at least in sections through the first intermediate shaft and one end of the second intermediate shaft is mounted on a claw of the output shaft.

A particularly compact construction of the drive device can be achieved with this embodiment.

Furthermore, a first idler gearwheel and a second idler gearwheel can be arranged on the second input shaft. The first idler gearwheel on the second input shaft can mesh with the fixed gearwheel on the output shaft or be in engagement therewith. The second idler gearwheel on the second input shaft can mesh with the second fixed gearwheel on the first intermediate shaft or be in engagement therewith. The gearbox can have a sixth shift element and a seventh shift element of the shift elements. A rotational movement of the first idler gearwheel on the second input shaft can be coupled to a rotational movement of the second input shaft by way of the sixth shift element so that the first idler gearwheel on the second input shaft is connected to the second input shaft in a rotationally-fixed manner. A rotational movement of the second idler gearwheel on the second input shaft can be coupled to the rotational movement of the second input shaft by way of the seventh shift element so that the second idler gearwheel on the second input shaft is connected to the second input shaft in a rotationally-fixed manner.

The drive can thus be transferred from the second input shaft to the output shaft, either directly by the coupling by way of the first shift element or indirectly, via the first intermediate shaft, by the coupling by way of the seventh shift element.

The sixth shift element and the seventh shift element here can each be formed as a power shift clutch.

Up to three gears of the secondary drive can be particularly advantageously activatable here via two power shift clutches on the second input shaft. This results in additional degrees of freedom in the connection of the secondary drive, in particular in a hybrid drive, e.g., in boost mode, with a smooth application of the driving torque of the secondary drive.

Furthermore, a first gear of the secondary drive can be shifted in gears 1 to 3 of the primary drive, a third gear of the secondary drive in gears 4 to 6 of the primary drive and a second gear of the secondary drive in all gears of the primary drive.

The gearbox can be designed in such a way that it can be operated by correspondingly shifted shift elements in a stationary charging mode, in which the first input shaft outputs to the second input shaft and a driving torque is not transferred to the output shaft.

In a preferred embodiment of the invention, the first input shaft can output to the second input shaft without a driving torque on the output shaft via correspondingly shifted shift elements, and thereby provide a stationary charging function by way of which a traction battery of the motor vehicle can also be charged outside of the driving mode if required.

It is advantageous here that, in the stationary charging function, it is possible to control a starting mode of the motor vehicle by shifting the sixth shift element to an ON state in which the first idler gearwheel on the second input shaft is connected to the second input shaft in a rotationally-fixed manner. The motor vehicle can therefore also be started virtually without delay via the primary drive during the stationary charging function.

The first idler gearwheel on the first input shaft, the fixed gearwheel on the output shaft and the first idler gearwheel on the second input shaft can be arranged in a first gearwheel plane.

The second idler gearwheel on the first input shaft and the first fixed gearwheel on the first intermediate shaft can be arranged in a second gearwheel plane.

The third idler gearwheel on the first input shaft, the second fixed gearwheel on the first intermediate shaft and the second idler gearwheel on the second input shaft can be arranged in a third gearwheel plane.

The fixed gearwheel on the first input shaft and the fixed gearwheel on the second intermediate shaft can be arranged in a fourth gearwheel plane.

Two of the six gears of the primary drive can be winding-path gears with a power flow via more than one gearwheel plane in each case. For example, the winding-path gears can be gears 5 and 6 of the primary drive, although, for reasons of efficiency, they are preferably gears 1 and 2 which are used less frequently in the driving mode of the motor vehicle.

The drive device can be designed in such a way that the secondary drive outputs indirectly to the second input shaft via a gear drive and the output shaft outputs to a final output shaft by way of a further gear drive. Such an embodiment results in additional degrees of freedom both in the spatial arrangement of the components and in the configuration of the transmission.

According to one embodiment, the first input shaft is connected to the primary drive via a separating clutch.

A motor vehicle according to one embodiment includes a drive device according to one of the embodiments mentioned above.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a chart illustrating the shift options of gears 1 to 6 in the internal-combustion-engine mode and gears 1 to 3 in the electric-motor mode of the drive device according to FIG. 1.

FIG. 3 is a shift matrix of the shift elements of the drive device which are activated in the different gears.

DETAILED DESCRIPTION OF THE DRAWINGS

Figure 1:
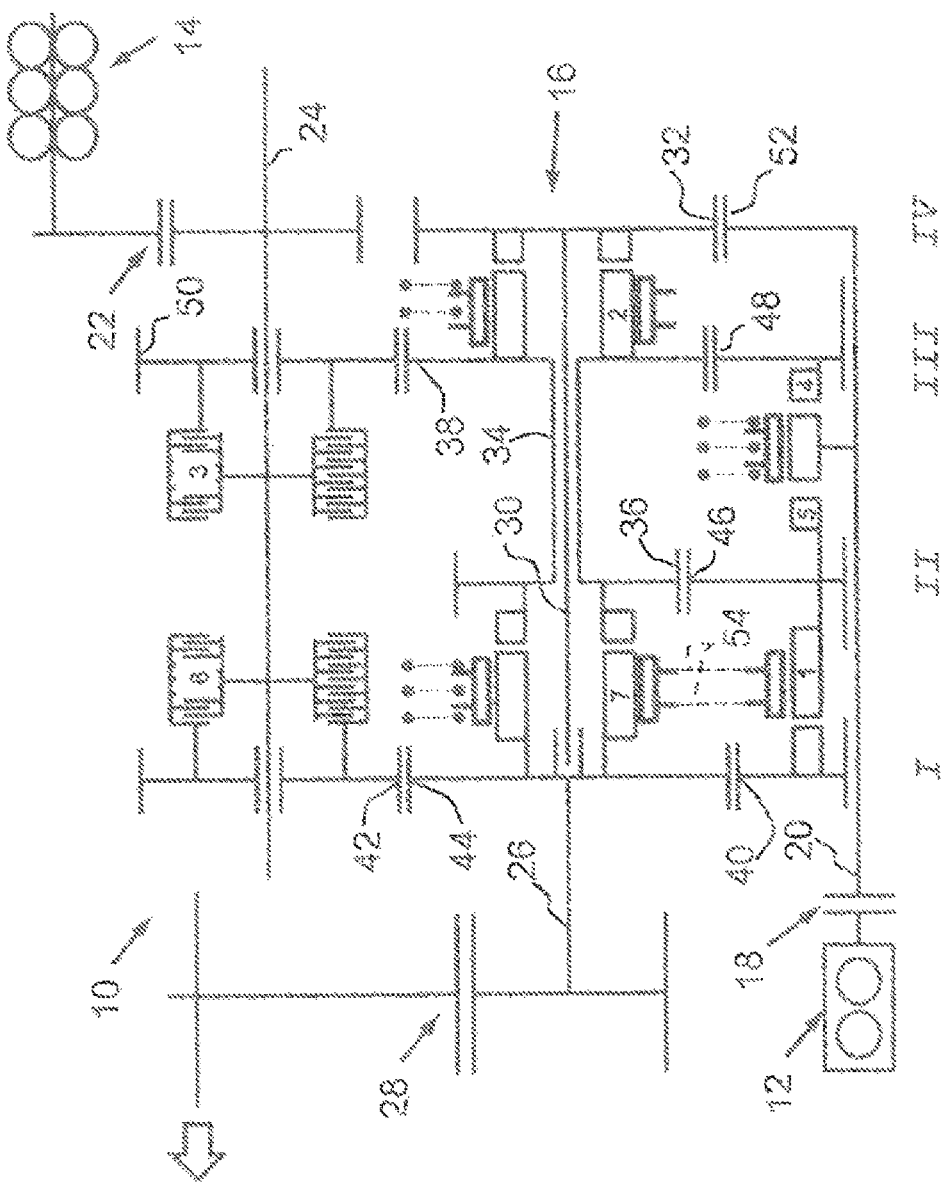
FIG. 1 is a block diagram of a drive device for a hybrid-driven motor vehicle according to an exemplary embodiment, which has a gearbox having four gearwheel planes via which six gears can be shifted in the internal-combustion-engine mode and three gears can be shifted in the electric-motor mode.

FIG. 1 illustrates a block diagram of a drive device 10 for a hybrid-driven motor vehicle according to an exemplary embodiment, in which a primary drive 12 formed as an internal combustion engine and a secondary drive 14 formed as an electric motor can be output to a common gearbox 16, in particular a common change speed gearbox 16, separately or together.

The internal combustion engine 12 is connected to a first input shaft 20 of the gearbox 16 via a separating clutch 18, which can be shifted between a coupling state and a decoupling state, and optionally via a torsional vibration damper (not shown), wherein a driving torque is transferred from the internal combustion engine 12 to the first input shaft 20 in the coupling state of the separating clutch 18 and the driving torque is not transferred from the internal combustion engine 12 to the first input shaft 20 in the decoupling state of the separating clutch 18. The electric motor 14 is connected to a second input shaft 24 via a spur gear 22. In other words, the electric motor 14 outputs to the second input shaft 24 via the spur gear 22. In another embodiment (not illustrated), the electric motor 14 can also be connected to the second input shaft 24 directly.

An output shaft 26 is furthermore provided as a third axially-parallel shaft of the gearbox 16, which output shaft is optionally operatively connected to a further drive train or a final output shaft of the motor vehicle, for example to an axle differential, via a spur gear 28 as a final drive or as an axle drive.

The gearbox 16 (without the spur gears 22, 28) has four gearwheel planes or stages I, II, III, IV, which are provided at a spacing from one another along a longitudinal direction of the first input shaft 20 and the second input shaft 24, and the gearwheels are in engagement with one another or mesh with one another as described above. The gearbox 16 here is designed in such a way that, by way of the corresponding shift positions of seven shift elements 1 to 7 described below, up to six gears for the primary drive 12, referred to below as ICE gears, and three gears for the secondary drive 14, referred to below as EM gears, can be shifted or adjusted.

The specific spatial arrangement of the first input shaft 20, the second input shaft 24 and the output shaft 26 can be selected depending on the selected transmission ratios, in particular the respective gearwheel sizes, and the structural properties. The axes of rotation of the first input shaft 20, the second input shaft 24 and the output shaft 26 here can be aligned parallel as illustrated in FIG. 1, although they are preferably arranged in such a way that, deviating from the graphic representation in FIG. 1, they form the corner points of a triangle or at least substantially form the corner points of a triangle in a cross-section perpendicular to the direction of extent of the axes of rotation or the longitudinal directions of the first input shaft 20, the second input shaft 24 and the output shaft 26.

An axially adjoining second intermediate shaft 30 is arranged coaxially to the output shaft 26, wherein one end of the second intermediate shaft 30 can in particular be supported by or on a claw which is mounted on the output shaft 26. A first intermediate shaft 34 formed as a hollow shaft is arranged on the second intermediate shaft 30. The second intermediate shaft 30 extends at least in sections through the first intermediate shaft 34. A fixed gearwheel 32 is arranged on the second intermediate shaft 30, and a first fixed gearwheel 36 and a second fixed gearwheel 38 are arranged on the first intermediate shaft (or the hollow shaft) 34.

The term "fixed gearwheel" here means that the corresponding gearwheel is connected to the corresponding shaft in a rotationally-fixed manner. The term "idler gearwheel" means that the corresponding gearwheel is arranged on the corresponding shaft in such a way that it is freely rotatable relative to the shaft provided that it is not connected to the shaft in a rotationally-fixed manner by way of a corresponding shift element.

The individual gearwheel planes or gearwheel stages I to IV are constructed as follows:

The gearwheel stage I has a first idler gearwheel 40 of the first input shaft 20, which is arranged on the first input shaft 20, a first idler gearwheel 42 of the second input shaft 24, which is arranged on the second input shaft 24, and a fixed gearwheel 44 of the output shaft 26, which is arranged on the output shaft 26;

the gearwheel stage II is composed of the first fixed gearwheel 36 on the first intermediate shaft 34 or hollow shaft 34 and a second idler gearwheel 46 on the first input shaft 20, which is arranged on the first input shaft 20;

the gearwheel stage III is formed by a third idler gearwheel 48 of the first input shaft 20, which is arranged on the first input shaft 20, the second fixed gearwheel 38 of the first intermediate shaft (or the hollow shaft) 34, which is arranged on the first intermediate shaft 34, and a second idler gearwheel 50 of the second input shaft 24, which is arranged on the second input shaft 24; and finally, the gearwheel stage IV has a fixed gearwheel 52 of the first input shaft 20, which is arranged on the first input shaft 20, and the fixed gearwheel 32 of the second intermediate shaft 30.

The said gearwheels are in engagement or mesh with one another as illustrated in FIG. 1, wherein the individual ICE gears and the individual EM gears can be adjusted by shifting the shift elements 1 to 7 accordingly.

A second shift element 1 is formed as a single synchronous clutch, which can be shifted between an ON and an OFF state. In the ON state, a rotational movement of the first idler gearwheel 40 of the first input shaft 20 is coupled to a rotational movement of the second idler gearwheel 46 of the first input shaft 20. In the OFF state, the first idler gearwheel 40 of the first input shaft 20 is decoupled from the second idler gearwheel 46 of the first input shaft 20. The same applies for the fifth shift element 2 formed as a single synchronous coupling, which is mounted on the first intermediate shaft (or the hollow shaft) 34 and via which a rotational movement of the first intermediate shaft 34 or a rotational movement of the second fixed gearwheel 38 of the second intermediate shaft 34 can be synchronously coupled to a rotational movement of the fixed gearwheel 32 of the second intermediate shaft 30.

A seventh shift element 3 and a sixth shift element 6 are each formed as a power shift clutch which can be shifted between an ON state and an OFF state, for example a hydraulically controlled multiple disk clutch, and arranged on the second input shaft 24.

In the ON state of the sixth shift element 6, the rotational movement of the first idler gearwheel 42 of the second input shaft 24 is coupled to the rotational movement of the second input shaft 24. In the OFF state of the sixth shift element 6, the rotational movement of the first idler gearwheel 42 of the second input shaft 24 is decoupled from the rotational movement of the second input shaft 24.

In the ON state of the seventh shift element 3, the rotational movement of the second idler gearwheel 50 of the second input shaft 24 is coupled to the rotational movement of the second input shaft 24. In the OFF state of the seventh shift element 3, the rotational movement of the second idler gearwheel 50 of the second input shaft 24 is decoupled from the rotational movement of the second input shaft 24.

The shift elements 4 and 5 are formed by a dual synchronous clutch, by way of which, alternating out of a neutral position, either the second idler gearwheel 46 of the first input shaft 20 or the third idler gearwheel 48 of the first input shaft 20 of the gearwheel planes II, III can be coupled to the first input shaft 20.

In particular, in an ON state of the third shift element 5, the rotational movement of the second idler gearwheel 46 of the first input shaft 20 is coupled to the rotational movement of the first input shaft 20. In an OFF state of the third shift element 5, the rotational movement of the second idler gearwheel 46 of the first input shaft 20 is decoupled from the rotational movement of the first input shaft 20.

Furthermore, in an ON state of the fourth shift element 4, the rotational movement of the third idler gearwheel 48 of the first input shaft 20 is coupled to the rotational movement of the first input shaft 20. In an OFF state of the fourth shift element 4, the rotational movement of the third idler gearwheel 48 of the first input shaft 20 is decoupled from the rotational movement of the first input shaft 20.

A first shift element 7 is finally formed as a single synchronous clutch which can be shifted between an ON and an OFF state. In the ON state of the first shift element 7, the rotational movement of the first fixed gearwheel 36 of the first intermediate shaft 34 or hollow shaft 34 is coupled to the rotational movement of the fixed gearwheel 44 of the output shaft 26. In the OFF state of the first shift element 7, the first fixed gearwheel 36 of the first intermediate shaft 34 is decoupled from the fixed gearwheel 44 of the output shaft 26.

The second shift element 1 on the first input shaft 20, which is formed as a single synchronous clutch, and the first shift element 7 on the first intermediate shaft 34 or hollow shaft 34, which is formed as a single synchronous clutch, can be actuated together out of a neutral position, to the left or right in the plane of the drawing of FIG. 1, via a connection which is indicated by the dashed lines 54 in FIG. 1. Thus, only one shift actuation by a common actuator, which is formed for example as a hydraulic or electric actuating member, is required. In particular, by way of a shift actuation by the common actuator, it is possible to shift between a first state of the gearbox 16, in which a rotational movement of the first fixed gearwheel 36 of the first intermediate shaft 30 is synchronously coupled to the rotational movement of the output shaft 26 via the first shift element 7, a second state of the gearbox 16, in which a rotational movement of the first idler gearwheel 40 of the first input shaft 20 is synchronously coupled to a rotational movement of the second idler gearwheel 46 of the first input shaft 20 via the second shift element 1, and a third state of the gearbox, in which both the rotational movement of the fixed gearwheel 44 of the output shaft 26 is decoupled from the rotational movement of the first fixed gearwheel 36 of the first intermediate shaft (or the hollow shaft) 34 and the rotational movement of the first idler gearwheel 40 of the first input shaft 20 is decoupled from the rotational movement of the second idler gearwheel 46 of the first input shaft 20.

Owing to the positions of the first shift element 7 and the second shift element 1 in the third state of the gearbox 16, the rotational movement of the output shaft 26 is decoupled from the rotational movement of the first input shaft 20.

Furthermore, as a result of the connection (illustrated by the dashed lines 54 in FIG. 1) between the second shift element 1 and the first shift element 7, it is ensured that only either the second shift element 1 or the first shift element 7 can be located in the ON state, whilst the other of the second shift element 1 and the first shift element 7 in each case is located in the OFF state. Therefore, the second shift element 1 and the first shift element 7 cannot be located in the ON state at the same time in any gear position.

The EM gears 1 to 3 can be adjusted via the shift elements 3 and 6 formed as power shift clutches wherein, in the gear EM 2, the sixth shift element 6 is shifted to ON or is located in the ON state whereby the rotational movement of the first idler gearwheel 42 of the second input shaft 24 is coupled to the rotational movement of the second intermediate shaft 24. Therefore, the rotational movement of the second input shaft 24 is transferred to the output shaft 26 by the meshing of the rotationally-fixed first idler gearwheel 42 of the second input shaft 24 with the fixed gearwheel 44 of the output shaft 26. This has the advantage that the gear EM2 can be superimposed on all gears ICE1 to ICE6. With this superimposition, the speed of the secondary drive 14 is adapted according to the selected ICE gear and the speed of the primary drive 12.

In the gear EM1 and the gear EM3, the power flow extends over the gearwheel plane III when the seventh shift element 3 is shifted to ON or the power shift clutch 3 is closed, wherein other shift elements can be shifted to ON or OFF in accordance with the shift matrix according to FIG. 3.

FIG. 2 is a matrix which shows which of the gears EM1 to EM3 can be superimposed on the gears ICE1 to ICE6.

Here, an "x" mark in the matrix means that the EM gear corresponding to the respective column can be superimposed on the ICE gear corresponding to the respective row. An empty box in the matrix, on the other hand, means that the EM gear corresponding to the respective column cannot be superimposed on the ICE gear corresponding to the respective row.

As can be seen from the matrix in FIG. 2, the gear EM2 can be shifted or used in all gears ICE1 to ICE6 owing to the direct power flow to the output shaft 26 via the sixth shift element 6 located in the ON state.

The gear EM1, on the other hand, can only be shifted or used in gears ICE1 to ICE3, whilst the gear EM3 can only be shifted or used in gears ICE4 to ICE6.

FIG. 3 shows a shift matrix which illustrates the shift states of the shift elements 1, 2, 4, 5 and 7 depending on the gears ICE1 to ICE6. A corresponding "x" mark in the matrix indicates that the corresponding shift element 1, 2, 4, 5 and 7 is located in the ON state whilst an empty box in the matrix indicates that the corresponding shift element is located in the OFF state.

The "x" marks in brackets in the corresponding columns of the shift elements 3 and 6 mean that one of the seventh shift element 3 and the sixth shift element 6 can be additionally located in the ON state whilst the other of the seventh shift element 3 and the sixth shift element 6 in each case is located in the OFF state in order to superimpose the secondary drive 14 on the primary drive 12.

The respective power flow in the gearbox 16 can also be understood from the matrix illustrated in FIG. 3.

All gears EM1 to EM3 could theoretically be connected to gears ICE1 to ICE6. However, the seventh shift element 3 and the sixth shift element 6 cannot both be located in the ON state.

Figure 4:
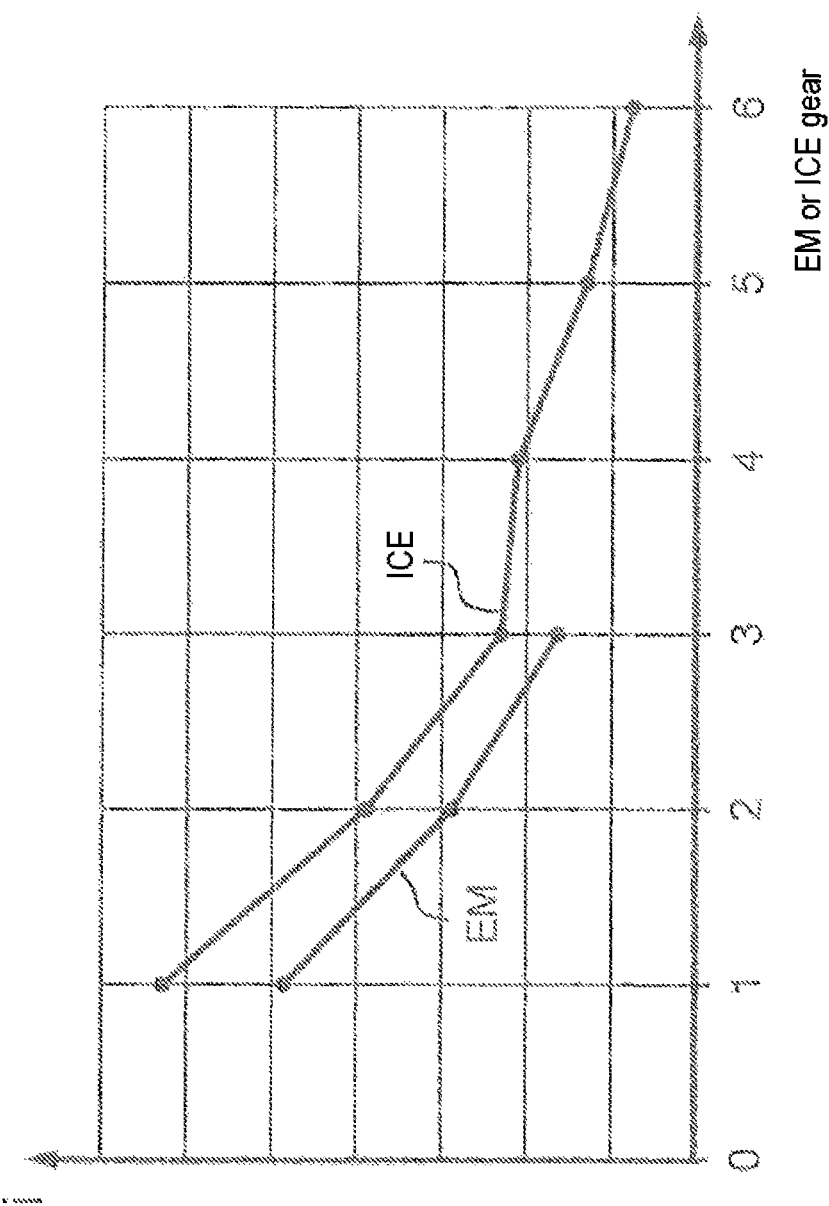
FIG. 4 is an exemplary illustration of the transmission stages in the primary drive and in the secondary drive of the drive device.

A curve indicated as "ICE" in FIG. 4 shows the transmission ratios or transmission ranges i preferred in the primary drive relating to the internal combustion engine in gears ICE1 to ICE6. A curve indicated as "EM" in FIG. 4 shows the transmission ratios or transmission ranges i preferred in the secondary drive relating to the electric motor in gears EM1 to EM3. The gear spread in the ICE gears can preferably be 5 to in particular 11, whilst the spread in the EM gears can be approximately 3 to 4.

As shown in FIG. 4, owing to the other transmission ratios, the gear increments between the gears ICE3 and ICE4 can be so small that a progressive ratio ($\varphi$=1) is preferably provided and is taken into account accordingly in the shift actuation. The gearbox 16 would in effect only have 5 ICE gears, which advantageously can be shifted more easily and can have relatively uniform progressive ratios.

Via the gearbox 16 in the described form, it is also possible to control a stationary charging function in which the electric motor 14 can be driven as a generator without an output torque on the output shaft 26.

The power flow here extends from the primary drive 12 formed as an internal combustion engine, via the first input shaft 20 and the fourth shift element 4, which is located in the ON state and is formed as a synchronous clutch, to the gearwheel plane III or the third idler gearwheel 48 of the first input shaft 20, the second fixed gearwheel 38 of the first intermediate shaft 34, the second idler gearwheel 50 of the second input shaft 24 and, from there, via the seventh shift element 3 located in the ON state, to the secondary drive 14 formed as an electric motor.

If the motor vehicle is to be started during the stationary charging function, it can be controlled virtually without delay by additionally shifting the sixth shift element 6 on the second input shaft 24 to the ON state, wherein the driving torque is then conducted to the output shaft 26 via the gearwheel plane I.

The drive device 10 described can be operated in the three gears EM1 to EM3 relating to the electric motor when the separating clutch 18 is located in the decoupling state, in the gears ICE1 to ICE6 relating to the internal combustion engine when the separating clutch 18 is located in the coupling state and both the sixth shift element 6 and the seventh shift element 3 are located in the OFF state, or, in hybrid mode, in the shift options illustrated according to FIG. 2 and preferably according to the shift matrix illustrated in FIG. 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive device for a hybrid-driven motor vehicle, comprising:
   a primary drive;
   a secondary drive; and
   a gearbox,
   wherein
   the primary drive and the secondary drive are configured to output to the gearbox separately or together,
   the gearbox includes
   a first input shaft which is operatively connectable to the primary drive,
   a second input shaft which is operatively connectable to the secondary drive,
   an output shaft,
   shift elements,
   a first intermediate shaft on which a first fixed gearwheel is arranged and which is operatively connectable to the first input shaft and the second input shaft, and
   a second intermediate shaft on which a fixed gearwheel is arranged, which is operatively connected to a fixed gearwheel of the first input shaft, the second intermediate shaft being arranged at least partially concentrically inside the first intermediate shaft,
   in a first state of the gearbox, a rotational movement of the first fixed gearwheel on the first intermediate shaft is synchronously coupled to a rotational movement of the output shaft via a first shift element of the shift elements,
   in a second state of the gearbox, a rotational movement of a first idler gearwheel on the first input shaft is synchronously coupled to a rotational movement of a second idler gearwheel on the first input shaft via a second shift element of the shift elements,
   the first idler gearwheel on the first input shaft meshes with a fixed gearwheel on the output shaft,
   the second idler gearwheel on the first input shaft meshes with the first fixed gearwheel on the first intermediate shaft, and
   the second input shaft is spaced parallel to and laterally apart from the first and second intermediate shafts, and is not fixed to a gear that is directly engaged with a gear of the second intermediate shaft.

2. The drive device according to claim 1, wherein
   a third idler gearwheel is arranged on the first input shaft, which gearwheel meshes with a second fixed gearwheel on the first intermediate shaft, and
   in both the first and second states of the gearbox,
   either a rotational movement of the second gearwheel on the first input shaft is couplable to the rotational movement of the first input shaft by a third shift element of the shift elements, or
   a rotational movement of the third idler gearwheel on the first input shaft is couplable to the rotational movement of the first input shaft by a fourth shift element of the shift elements.

3. The drive device according to claim 2, wherein the third shift element and the fourth shift element are formed as a common synchronous dual clutch.

4. The drive device according to claim 3, wherein
   a rotational movement of the first intermediate shaft and a rotational movement of the second intermediate shaft are couplable via a fifth shift element of the shift elements.

5. The drive device according to claim 4, wherein
   the first intermediate shaft and the second intermediate shaft are arranged coaxially to the output shaft,
   the first intermediate shaft is formed as a hollow shaft,
   the second intermediate shaft extends through the first intermediate shaft, and one end of the second intermediate shaft is mounted on a claw of the output shaft.

6. The drive device according to claim 5, wherein
a first idler gearwheel and a second idler gearwheel are arranged on the second input shaft,
the first idler gearwheel on the second input shaft meshes with the fixed gearwheel on the output shaft,
the second idler gearwheel on the second input shaft meshes with a second fixed gearwheel on the first intermediate shaft,
the gearbox includes a sixth shift element and a seventh shift element,
a rotational movement of the first idler gearwheel on the second input shaft is couplable to a rotational movement of the second input shaft by way of the sixth shift element, and
a rotational movement of the second idler gearwheel on the second input shaft is couplable to the rotational movement of the second input shaft by way of the seventh shift element.

7. The drive device according to claim 6, wherein the sixth shift element and the seventh shift element are each formed as a power shift clutch.

8. The drive device according to claim 6, wherein
the gearbox is operable by correspondingly shifted shift elements in a stationary charging mode in which the first input shaft outputs to the second input shaft and a driving torque is not transferred to the output shaft.

9. The drive device according to claim 8, wherein the first input shaft is connected to the primary drive via a separating clutch.

10. The drive device according to claim 6, wherein
the first idler gearwheel on the first input shaft, the fixed gearwheel on the output shaft, and the first idler gearwheel on the second input shaft are arranged in a first gearwheel plane.

11. The drive device according to claim 6, wherein a third idler gearwheel on the first input shaft, the second fixed gearwheel on the first intermediate shaft, and the second idler gearwheel on the second input shaft are arranged in a third gearwheel plane.

12. The drive device according to claim 6, wherein the secondary drive outputs indirectly to the second input shaft via a gear drive.

13. The drive device according to claim 1, wherein
the first shift element and the second shift element are each formed as a clutch acting with form fit, and
the first shift element and the second shift element are actuatable together by a single actuator to shift between the first state and the second state of the gearbox.

14. The drive device according to claim 1, wherein
the gearbox is operable by correspondingly shifted shift elements in a stationary charging mode in which the first input shaft outputs to the second input shaft and a driving torque is not transferred to the output shaft.

15. The drive device according to claim 14, in which a fixed gearwheel on the first input shaft and a fixed gearwheel on a second intermediate shaft are arranged in a fourth gearwheel plane.

16. The drive device according to claim 1, wherein
the second idler gearwheel on the first input shaft and the first fixed gearwheel on the first intermediate shaft are arranged in a second gearwheel plane.

17. The drive device according to claim 1, wherein the secondary drive outputs indirectly to the second input shaft via a gear drive.

18. The drive device according to claim 1, wherein the output shaft outputs to a final output shaft by way of a further gear drive.

19. The drive device according to claim 1, wherein the first input shaft is connected to the primary drive via a separating clutch.

20. A motor vehicle comprising:
a drive device according to claim 1.

* * * * *